(12) United States Patent
Hattori et al.

(10) Patent No.: US 7,657,352 B2
(45) Date of Patent: Feb. 2, 2010

(54) AUTOMATIC CONTROL SYSTEM

(75) Inventors: Toshihiro Hattori, Okazaki (JP);
Hideyuki Morita, Nishikamo (JP);
Mitsuyasu Matsuura, Chiryu (JP)

(73) Assignees: Nippon Soken Inc., Nishio (JP); Denso Corporation, Kariya (JP)

( * ) Notice: Subject to any disclaimer, the term of this patent is extended or adjusted under 35 U.S.C. 154(b) by 355 days.

(21) Appl. No.: 11/498,979

(22) Filed: Aug. 4, 2006

(65) Prior Publication Data

US 2007/0124029 A1 May 31, 2007

(30) Foreign Application Priority Data

Aug. 4, 2005 (JP) ............................. 2005-227057

(51) Int. Cl.
*G06F 19/00* (2006.01)
*G06F 17/00* (2006.01)

(52) U.S. Cl. ............................. 701/36; 701/29; 701/48; 701/1; 700/31; 700/34; 700/47; 700/52; 307/10.8; 704/270; 318/483

(58) Field of Classification Search ................. 318/483; 701/1; 340/988, 148.3; 706/13; 700/36, 700/34, 47
See application file for complete search history.

(56) References Cited

U.S. PATENT DOCUMENTS

| | | | |
|---|---|---|---|
| 6,032,139 A | 2/2000 | Yamaguchi et al. | |
| 6,064,996 A | 5/2000 | Yamaguchi et al. | |
| 6,240,347 B1 * | 5/2001 | Everhart et al. | 701/36 |
| 6,249,720 B1 * | 6/2001 | Kubota et al. | 701/1 |
| 6,304,862 B1 | 10/2001 | Yamaguchi et al. | |
| 6,314,412 B1 | 11/2001 | Yamaguchi et al. | |
| 6,324,529 B1 | 11/2001 | Kamihira et al. | |
| 6,324,530 B1 | 11/2001 | Yamaguchi et al. | |
| 6,337,552 B1 * | 1/2002 | Inoue et al. | 318/568.2 |
| 6,351,698 B1 * | 2/2002 | Kubota et al. | 701/51 |
| 6,580,973 B2 * | 6/2003 | Leivian et al. | 701/1 |
| 6,778,906 B1 * | 8/2004 | Hennings et al. | 701/301 |
| 7,107,271 B2 * | 9/2006 | Aoki et al. | 707/10 |
| 2001/0020202 A1 * | 9/2001 | Obradovich et al. | 701/1 |

(Continued)

FOREIGN PATENT DOCUMENTS

JP 60-261758 12/1985

(Continued)

OTHER PUBLICATIONS

Yang,Guoqing; Wu,Zhaohui; li,Xiumei; and Chen,Wei; SVE:Embedded Agent Based Smart Vehicle Environment, 0-7803-8125-Apr. 2003 (c) 2003 IEEE.*

(Continued)

*Primary Examiner*—Thomas G Black
*Assistant Examiner*—Lin B Olsen
(74) *Attorney, Agent, or Firm*—Nixon & Vanderhye P.C.

(57) ABSTRACT

An automatic control system provides control of an automotive system in a vehicle based on at least one piece of control provision determination information. The automatic control system includes an information acquisition unit for acquiring the control provision determination information, and determines provision of the control for the automotive system based on predetermined criteria. The criteria defines when and how the query of control provision is conducted by the automatic control system.

34 Claims, 9 Drawing Sheets

U.S. PATENT DOCUMENTS

| | | | |
|---|---|---|---|
| 2003/0167112 A1* | 9/2003 | Akiyama | 701/36 |
| 2004/0172172 A1* | 9/2004 | Kubota et al. | 701/1 |
| 2005/0031100 A1* | 2/2005 | Iggulden et al. | 379/102.03 |
| 2005/0222726 A1* | 10/2005 | Furui et al. | 701/36 |
| 2006/0155445 A1* | 7/2006 | Browne et al. | 701/49 |

FOREIGN PATENT DOCUMENTS

| | | |
|---|---|---|
| JP | 60261758 A * | 12/1985 |
| JP | 11-288296 | 10/1999 |
| JP | 2000-186942 | 7/2000 |
| JP | 2003-048416 | 2/2003 |
| WO | WO 2004101306 A1 * | 11/2004 |

OTHER PUBLICATIONS

Office Action issued Sep. 16, 2008 in corresponding Japanese Application No. 2005-227057.

* cited by examiner

FIG. 4A (S20:Yes) + (S30:Yes) + (S50:No) from Fig. 2

FIG. 4B (S20:Yes) + (S30:No) from Fig. 2

AUTOMATIC CONTROL SYSTEM

CROSS REFERENCE TO RELATED APPLICATION

This application is based on and claims the benefit of priority of Japanese Patent Application No. 2005-227057 filed on Aug. 4, 2005, the disclosure of which is incorporated herein by reference.

FIELD OF THE DISCLOSURE

The present disclosure generally relates to an automatic control system in a vehicle.

BACKGROUND OF THE DISCLOSURE

In recent years, various vehicular systems and/or devices such as an automatic headlight control system, an automatic wiper control system and the like are controlled by an automatic control system. For example, the automatic headlight control system detects brightness around a vehicle by using a sensor, and turns on a headlight when degrees of the brightness fall under a predetermined value. The automatic wiper control system is, for another example, coupled with a rain sensor that detects wetting on a windshield for an automatic turn on/off operation upon detecting the wetting.

Yet another example of the automatic control system is an agent system. For example, Japanese Patent Document JP-A-2000-186942 discloses the agent system that is equipped with a display unit for displaying an agent represented by a messenger or an animal in a cartoon fashion. A user of the agent system, e.g., a driver of the vehicle or an occupant of the vehicle, is queried whether he/she desires a control of the vehicular system or the device when the user has a dialog with the agent system. The agent system controls the vehicular system when it determines, based on the dialog with the user, that the control of the vehicular system is desired by the user.

The agent system in the above disclosure asks the user, "Do you want to turn on the light ?" "Do you want to have a navigation to a restaurant ?" or similar kind of questions. When the proposal for controlling the vehicular system from the agent system is affirmatively confirmed by the user with a reply of a word such as "YES" or the like, the agent system automatically provides a control for the vehicular system such as the automatic headlight control system, a navigation system, or the like.

However, provision of the control based on a sensor signal from, for example, a light sensor or the like sometimes causes inconvenience and uncomfortableness to the user because of the discrepancy between the user's needs for the control and the content of the control based on the sensor signal. In this case, the agent system may have control provision standard that is stricter than a current one for providing the same control. That is, the light may be turned on when the degrees of brightness around the vehicle become lower than the current standard. However, the stricter control provision standard may also cause inconvenience, when user feels that the agent system fails to turn on the light at an appropriate degree of brightness/darkness.

On the other hand, the provision of the control always satisfies the user when the automatic control system determines the provision of the control based on the query for the user prior to the provision of the control. That is, the probability of a suitable control provision will be improved while unnecessary provision of the control is suppressed. However, the user may be embarrass by the query from the agent system when the user thinks that the provision of the control is rightful without question. That is, the user may regard the query is unnecessary and annoying.

SUMMARY OF THE DISCLOSURE

In view of the above-described and other problems, the present disclosure provides an automatic control system that decreases a chance of unnecessary control provision that leads to an annoyance for a user without decreasing the chance of necessary control provision.

The automatic control system for providing control of an automotive system in a vehicle based on at least one piece of control provision determination information includes an information acquisition means for acquiring the control provision determination information, a determination means for determining whether the control provision determination information meets a query provision criterion for a user of the automotive device, a query provision means for providing a query of control provision for the user when the control provision determination information agrees with the query provision criterion and a control provision means for providing control of the automotive system based on one of a first condition and a second condition. The first condition for providing the control of the automotive system is a combined condition of an agreement of the control provision determination information with the query provision criterion and an affirmation of a query of control provision upon the agreement of the control provision determination information with the query provision criterion, and the second condition for providing the control of the automotive system is an agreement of the control provision determination information with a control provision without query criterion. The control provision without query criterion is, in other words, the criterion for control provision without asking whether the control is desired by the user The automatic control system in the present disclosure asks the driver whether he/she desires provision of the control of the automotive system before actually providing the control. In this manner, an unnecessary provision of the control becomes less probable. In addition, provision of the query for the user occurs only when the query provision criterion is satisfied. Therefore, the uncomfortableness of the driver caused by an unnecessary provision of the query becomes less probable. Further, the control provision without query criterion allows the automatic control system to provide the control without querying under a certain circumstance, thereby enabling the automatic provision of the control of the automotive system being maintained at least the same level.

In another aspect of the present disclosure, the query provision criterion and the control provision without query criterion in the automatic control system are changed to cause a more appropriate response from the automatic control system. In other words, the automatic control system learns how the user responded to the provision of the control, and reflects it to the criterion for query provision and the control provision without querying. More practically, the query provision criterion is made stricter and the control provision without query criterion is made more flexible or less strict to have a fewer number of queries. In this manner, the probability of uncomfortable querying from the automatic control system decreases while the probability of control provision at a necessary timing increases.

The uncomfortableness caused by provision of the unnecessary control seriously deteriorates the user's feeling. Therefore, the provision of the unnecessary control should be prevented even by compromising a necessary provision of the control. This scheme of control provision is achieved by calculating a summation of a control value of control categories for further refining the criterion. The control value may be summed to be compared with a predetermined value after adding/subtracting a fixed value of adjustment. In this manner, the response from the driver is weighted and is reflected to the modification of the criterion.

In yet another aspect of the present disclosure, the response from the user is collected by using a YES button and a NO button. Operation of these buttons is regarded as an affirmative/negative response, and an absence of button operation may also be regarded as either of the affirmative/negative response.

In still yet another aspect of the present disclosure, the control provided for the automotive system is explicitly displayed or notified for the user. In this manner, the driver does not lose control of the automotive system in terms of occurrence of subtle controls such as cool to dry air-conditioning change or the like.

In still yet another aspect of the present disclosure, the query of control provision can be turned off for the driver who does not like disturbance by the query while he/she is driving. Turning off of the query can either be manually controlled or automatic based on a predetermined condition.

In still yet another aspect of the present disclosure, the query provision criterion and the control provision without query criterion can be transferred to another automatic control system. In this manner, the driver can use the same criterion on a different vehicle.

BRIEF DESCRIPTION OF THE DRAWINGS

Other objects, features and advantages of the present disclosure will become more apparent from the following detailed description made with reference to the accompanying drawings, in which.

DETAILED DESCRIPTION OF THE PREFERRED EMBODIMENTS

Embodiments of the present disclosure are described with reference to the drawings. The embodiments of the present disclosure are not necessarily limited to the types/forms in the present embodiment, but may take any form of the art or technique that is regarded within the scope of the present disclosure by artisans who have ordinary skill in the art.

Figure 1:
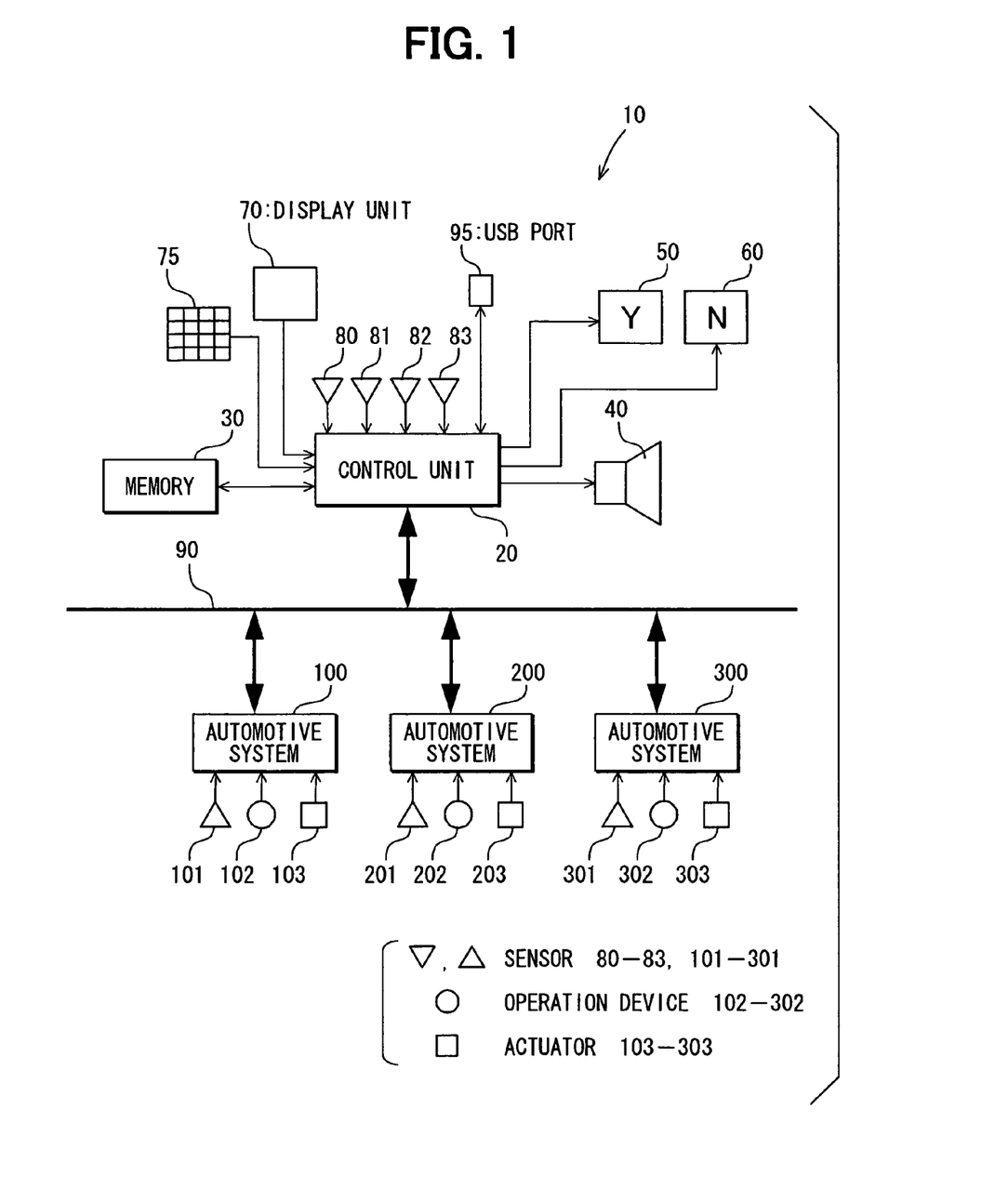
FIG. 1 shows a block diagram of an automatic control system in a first embodiment of the present disclosure.

FIG. 1 shows a block diagram of an automatic control system 10 in a first embodiment of the present disclosure. In the present disclosure, only one piece of the automatic control system 10 is disposed in a vehicle.

The automatic control system 10 includes a control unit 20, a memory 30, a speaker 40, a YES button 50, a NO button 60, a display unit 70, and operation switches 75. The control unit 20 is a well-known type computer, and the YES/NO buttons are for inputting an affirmative/negative response from a user of the automatic control system 10.

The control unit 20 includes a well-known type CPU, a ROM, a RAM, an I/O and a bus line for connecting these components. The ROM stores a program that is executed by the control unit 20, and the CPU executes a predetermined calculation process according to the program stored in the ROM.

The control unit 20 is coupled with plural types of automotive systems 100, 200, 300 by a vehicle LAN 90 for exchanging communication with each other. The control unit 20 is also coupled with plural types of sensors 80, 81, 82, 83 for exchanging signals with each other.

The memory 30 is, for example, a writable memory medium such as EPROM or the like. The memory 30 stores a query provision criterion and a control provision without query criterion for respective automotive systems 100, 200, 300, and respective users. The criterion of query provision and/or control provision without query are further distinguished for respective functions in the automotive system when the automotive system such as a navigation system is equipped with plural functions.

The control unit 20 is coupled with USB port 95 that serves as an I/O port. The control unit 20 outputs the query provision criterion and the control provision without query criterion from the USB port 95 to an external device such as, for example, a personal computer, or a portable memory medium. The control unit 20 overwrites the query provision criterion and the control provision without query criterion in the memory 30 based on the information retrieved from the external device.

The query provision criterion is a determination condition whether a query, or a question, of a control provision for the automotive systems 100, 200, 300 is provided for the user from a speaker 40. The control provision without query criterion is a determination condition whether control provision for the automotive systems 100, 200, 300 is provided without provision of the query for the user. The query provision criterion and the control provision without query criterion are predetermined conditions, and define a validation range for at least one piece of control provision determination information.

The automotive systems 100, 200, 300 includes, for example, a wiper control system, an air-conditioning system, a headlight control system, a navigation system, a radio, a door lock system, and an air-purifying system that are controllable by the control unit 20. The automotive systems 100, 200, 300 respectively have connection with sensors 101, 201, 301, operation devices 102, 202, 302, and actuators 103, 203, 303.

Detection signals (detection information) from the sensors 101, 201, 301 and operation signals (position of operations) on operation devices 102, 202, 302 are provided for the control unit 20 through the automotive systems 100, 200, 300 and the vehicle LAN 90.

The query provision criterion and the control provision without query criterion are described more in detail. When the automotive system 100 is assumed to be a wiper control system, the control provision determination information is an amount of rain r, and a rain sensor is disposed as sensors 80 to 83 or 101. The query provision criterion is determined as a range of rain amount between a first value r1 (e.g., a lower limit of sensitivity) to a second value r2 (an upper limit). The control provision without query criterion has the upper limit that is greater than the second value r2.

When the automotive system 200 is assumed to be a headlight control system, the control the control provision determination information is a degree of brightness L around the vehicle, and a light sensor is disposed as sensors 80 to 83 or 201. The query provision criterion is determined as a range of brightness between a first value L1 (an upper limit) to a second value L2 (a lower limit). The control provision without query criterion has the lower limit that is smaller than the second value L2.

When the automotive system 300 is assumed to be a navigation system and a weather information display function is under control of the automatic control system 10 of the present disclosure, the control provision determination information is, for example, information regarding an ordinal number of boarding on the vehicle in a specific day, a day of the week, and a time slot of the day. The query provision criterion is defined as a condition that the ordinal number of boarding is a first boarding on the vehicle of the day, and both of the day of the week and the time may be ignored. The control provision without query criterion may be defined as a blank condition, or a condition not usable for the navigation system as an initial setting. The control provision without query criterion may be acquired later in a condition modification process. A display unit of the navigation system may be used as the display unit 70 mentioned above.

The YES button 50 and the NO button 60 are disposed as push buttons. The YES button 50 and the NO button 60 are lit when a front position light is lit, and are also lit for a predetermined period after a query message is outputted from the speaker 40. The YES button 50 and the NO button 60 are combined to form a set of instruction buttons that are disposed, for example, on a steering wheel or the like for the ease of operability.

The operation switches 75 are disposed as touch switches on the display unit 70. The operation switches 75 may be disposed as mechanical button switches on the display unit 70.

The control unit 20 outputs a query message only once when boarding of the driver on the vehicle is detected. That is, the query message such as "Start query of control provision" is provided from the speaker 40 for determining whether the query of control provision is started. The boarding of the driver on the vehicle is detected based on, for example, a signal from a seat sensor in a driver's seat.

When the driver responds to the query message by pressing the YES button 50, the control unit 20 determines that start of the query of control provision is affirmed. Then, the control unit 20 proceeds to execute following processes. The start of the query of control provision may be affirmed by using one of the YES button 50 and the NO button 60. That is, pressing on the YES or NO button for a predetermined number of seconds may be used as an affirmation of the start of the query of control provision when the query of the control provision is not in operation.

After the start of the query of the control provision is affirmed, the control unit 20 displays user names registered in the memory 30, and encourages the user to select one of the user names displayed on the display unit 70 by providing a message from the speaker 40. The driver of the vehicle is determined based on the user name selected on the display unit 70 by operating the operation switches 75. The driver of the vehicle may be determined based on an image recognition, a voice recognition or other types of biometrics process.

Figure 2:
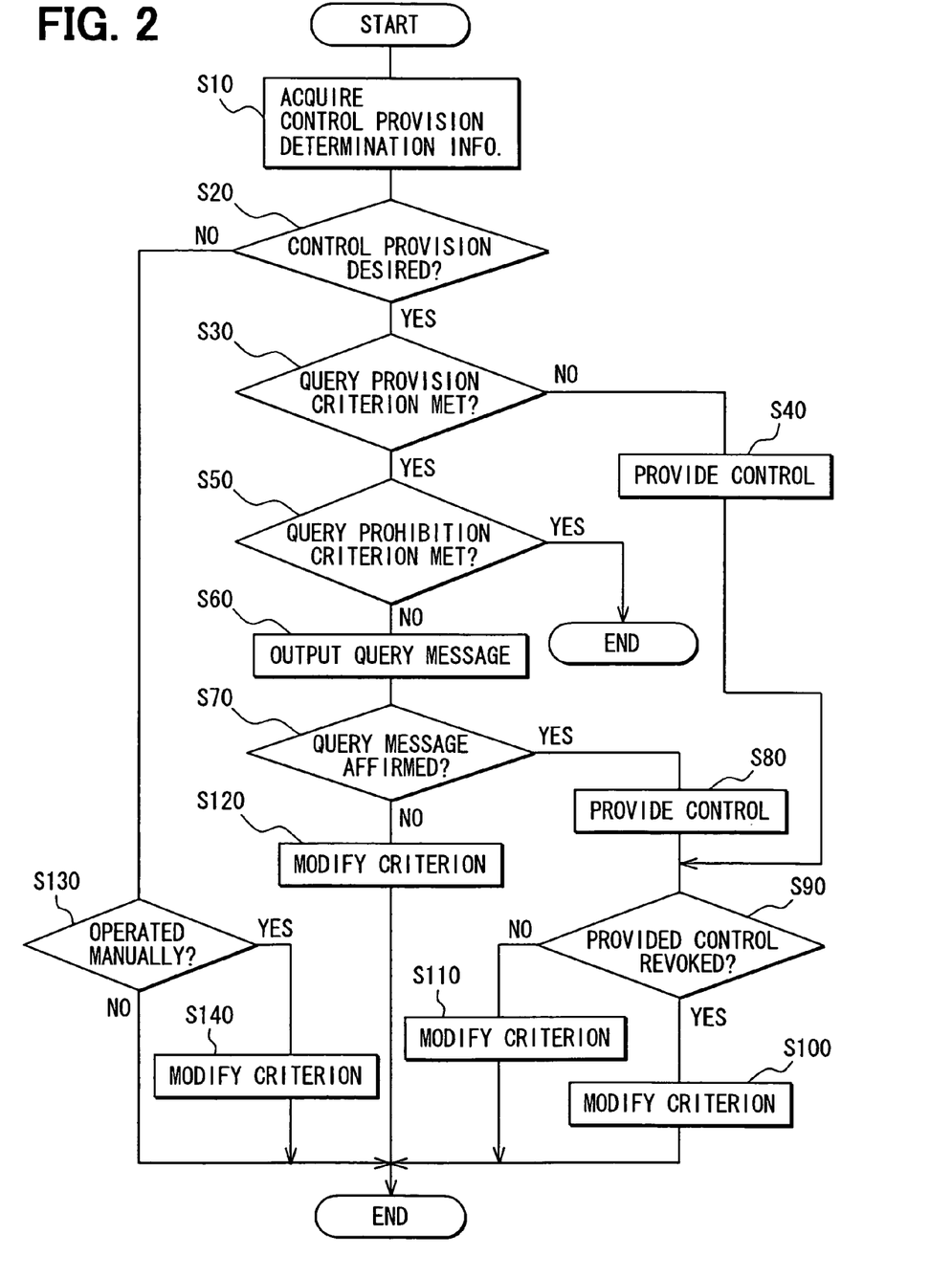
FIG. 2 shows a flowchart of a process executed in a control unit the automatic control system.

A control process described in a flowchart in FIG. 2 is executed after the determination of the driver of the vehicle. A negative response by pressing the NO button 60 to the above query message is regarded as a rejection of the query of control provision by the driver, thereby enforcing suppression of the query of control provision in the flowchart in FIG. 2. Absence of the response to the query message is also regarded identical to the negative response by the NO button 60.

In step S10 of FIG. 2, the process acquires the control provision determination information respectively determined for the automotive systems 100, 200, 300. That is, required information for controlling the automotive systems 100, 200, 300 coupled by the vehicle LAN 90 to the control unit 20 is acquired. Steps after step S10 are executed respectively for each of the automotive systems 100, 200, 300.

In step S20, the process determines whether there is a probability that the user is requesting control provision for the automotive systems 100, 200, 300. More practically, the control provision determination information acquired in step S10 is compared with the query provision criterion and the control provision without query criterion for validity. The control provision determination information in a validation range of the control provision without query criterion indicates that the control should be provided without querying for the user. The control provision determination information in a validation range of the query provision criterion indicates that there is a probability that the user requests for the control provision.

The control provision for, for example, the wiper control system or the headlight control system is determined in combination with a current state of control of these system in step S20, because the operation of these system are continued until a turn-off control is provided. That is, the validation condition of the control provision determination information for the wiper control system is changed (i.e., reversed) in step S20 (YES is changed to NO in step S20) when the wiper control system is already turned on.

In step S30, the process determines whether the query provision criterion or the control provision without query criterion is satisfied by the control provision determination information after the process in step S20 is affirmed. The query provision criterion and the control provision without query criterion are defined as mutually exclusive because the process in step S30 determines validity of only one of the two criteria.

Figure 4A:
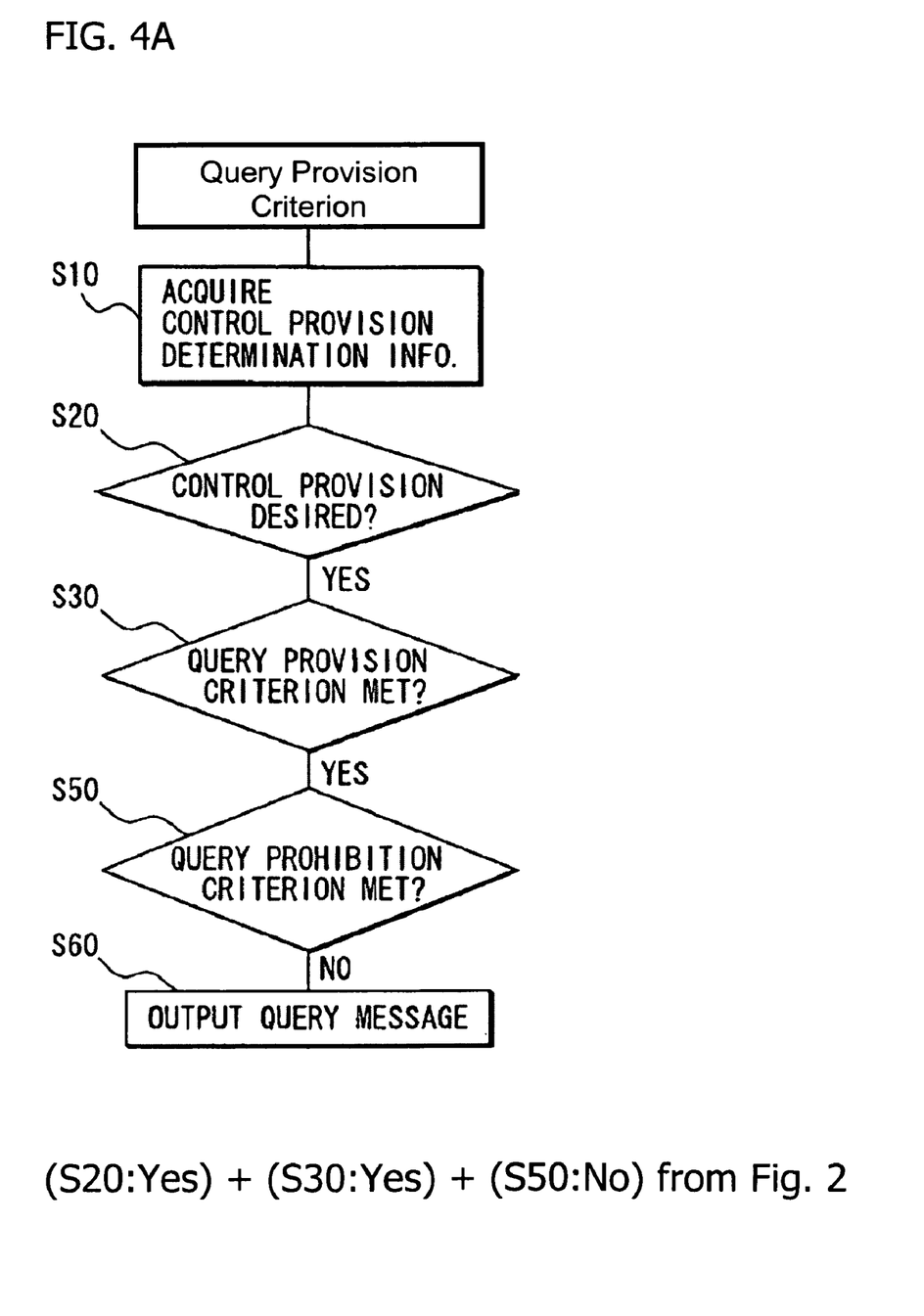
FIG. 4A shows a flowchart of the process illustrated in FIG. 2 in which a query provision criterion has been satisfied.
Figure 4B:
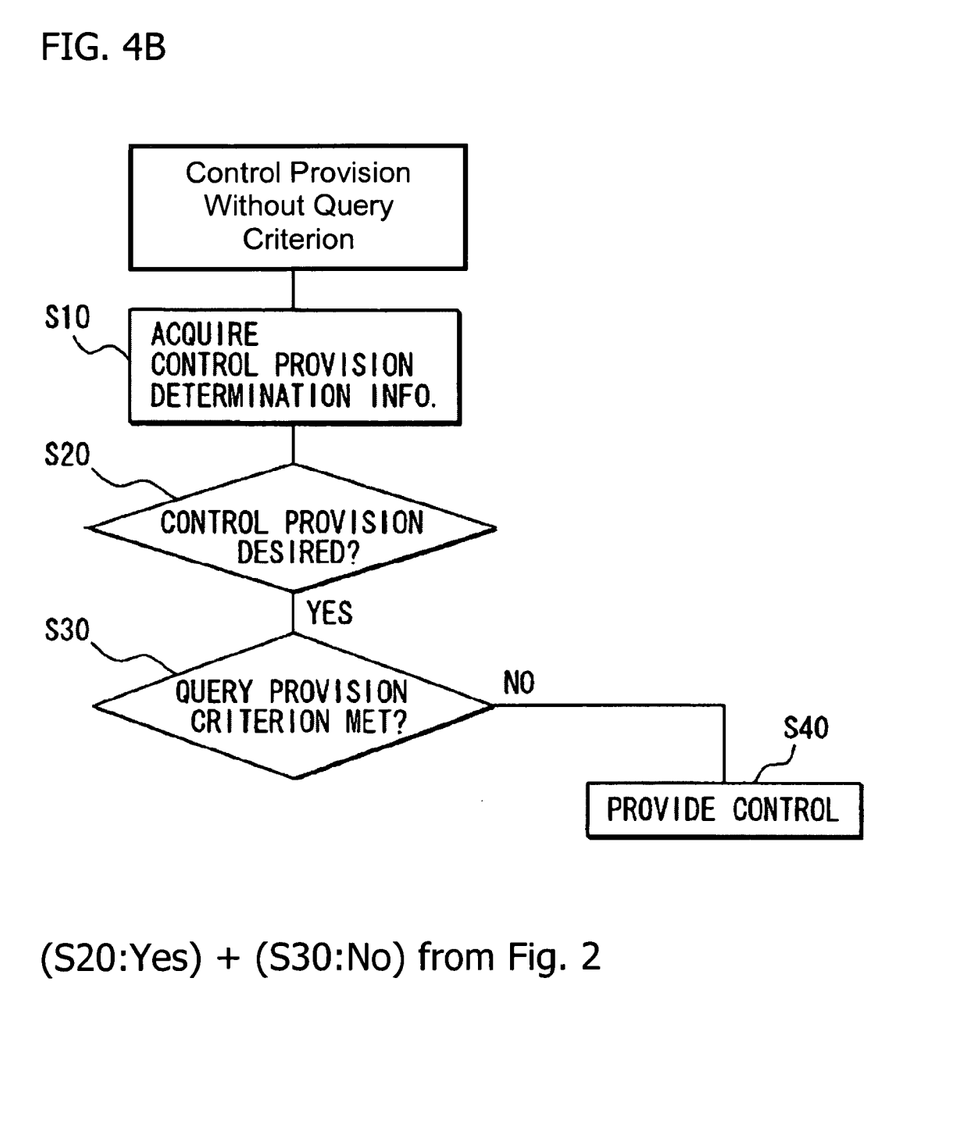
FIG. 4B shows a flowchart of the process illustrated in FIG. 2 in which a control provision without query criterion has been satisfied.

The process proceeds to step S40 when the control provision determination information meets the control provision without query criterion (step S30: NO). See FIG. 4B. The process provides the control of, for example, the wiper control system in step S40. The provision of control that is not easily recognizable by the user in step S40 is accompanied by a notification message of control provision. That is, control of air-conditioner mode change (e.g., from a cooling mode to a dry mode), control of headlight angle change, control of door lock state, or control of air-purifier operation is notified to the user by a voice message from the speaker 40. In this manner, the user can securely recognized the control provision, and can cancel the provision of control if he/she does not like the provision of the specific control.

The process proceeds to step S50 when the control provision determination information meets the query provision criterion (step S30: YES). The process determines whether a query prohibition criterion is satisfied by the control provision determination information in step S50. The query prohibition criterion is set for a definition of situation where the driver's attention should not be distracted from a driving operation by the provision of the query. In this case, the query prohibition criterion is defined as (1) a steering angle being equal to or greater than a predetermined angle that requires a series of successive operations, that is, the vehicle is turning from one direction to another, (2) an acceleration of the vehicle is equal to or greater than a predetermined value, that is, a throttle opening angle being equal to or greater than a predetermined angle, (3) a yaw rate is equal to or greater than a predetermined value (same as situation (1)), (4) a vehicle positioned in an intersection based on a signal from GPS satellite or the like, (5) a brake system is being operated or the like.

When the control provision determination information meets the query prohibition criterion (step S50: YES), the process concludes itself. The process proceeds to step S60 when the control provision determination information does not meet the query prohibition criterion (step S50: NO). The process outputs a predetermined query message from the speaker 40 in step S60. See FIG. 4A. Different query message is prepared for respective automotive systems 100, 200, 300. The query message expects a YES/NO type answer from the user. That is, the query message sounds like "Would you like to operate the wiper?" when the subject of the control is the wiper control system.

The process proceeds to step S70 after step S60. The process determines whether the query message is affirmed by the user. That is, the process determines whether the YES button 50 is pressed within a predetermined period after step S60.

The process proceeds to step S80 when the YES button 50 is pressed within the predetermined period. The process executes an affirmed control based on the response to the query message. The process proceeds to step S90 after step S80.

The process in step S90 determines whether provision of the control of the automotive system in step S80 or in step S40 is repeated by the user within a predetermined period (within a relatively short time) after the control in step S80/S40. The process proceeds to step S100 when the automotive system is operated within the predetermined period, that is, the control provided by the automatic control system 10 is changed by the user (step S90: YES).

The process in step S100 provides modification to the query provision criterion or the control provision without query criterion. In this manner, user preference of a specific control is "learned" by the automatic control system 10.

The process in step S100 determines, in a first place, that which control category in a predetermined set of categories includes a control value of the control provision determination information acquired in step S110. When there are plural types of control provision determination information for the respective automotive systems 100, 200, 300, each of the plural types of the control provision determination information is examined in terms of the control category. The control categories of the plural types of the control provision determination information are determined as same when all of the plural types fall in the same control category. As discussed above, the automotive systems 100, 200, 300 may include, for example, a wiper control system, an air-conditioning system, a headlight control system, a navigation system, a radio, a door lock system, and an air-purifying system that are controllable by the control unit 20. Accordingly, different types of the control provision determination information (each having associated control values) may be an amount of rain r when the automotive system 100 is assumed to be a wiper control system, a degree of brightness L around the vehicle when the automotive system 200 is assumed to be a headlight control system, or information regarding an ordinal number of boarding on the vehicle in a specific day, day of the week, and time slot of the day when the automotive system 300 is assumed to be a navigation system and weather information display function.

Figure 5A:
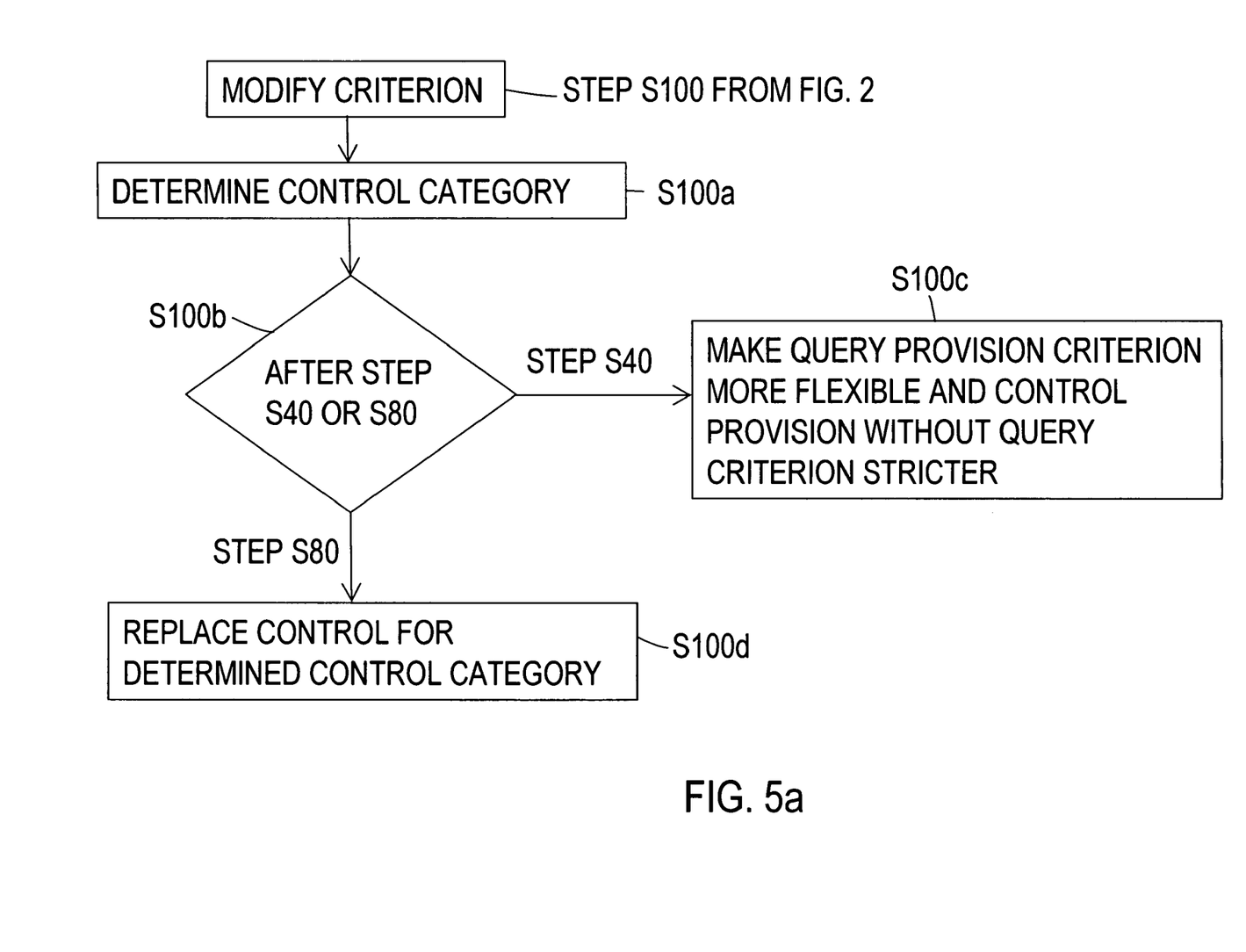
FIG. 5a shows a flowchart of example sub-steps of process step S100 illustrated in FIG. 2.

As illustrated in sub-steps S100a-S100c of FIG. 5a, the process makes the query provision criterion more flexible and the control provision without query criterion stricter (i.e., more strict or narrower) when step S100 of FIG. 2 comes after step S40, that is, the control is provided without query of the control provision. This modification of criterion reflects an intention or preference that the control value of the control provision determination information is preferably included in the determined control category of the query provision criterion. In this manner, the same control value of the control provision determination information provides the query of the control provision instead of providing the control without querying for a next occasion of the control provision, thereby enabling prevention of an unnecessary control provision that causes the user's annoyance.

As illustrated in sub-steps 100a, 100b and 100d of FIG. 5a, the process replaces the control for the determined control category with the control repeated by the user when step S100 comes after step S80, based on an assumption that the provided control is not preferred by the user.

Figure 5B:
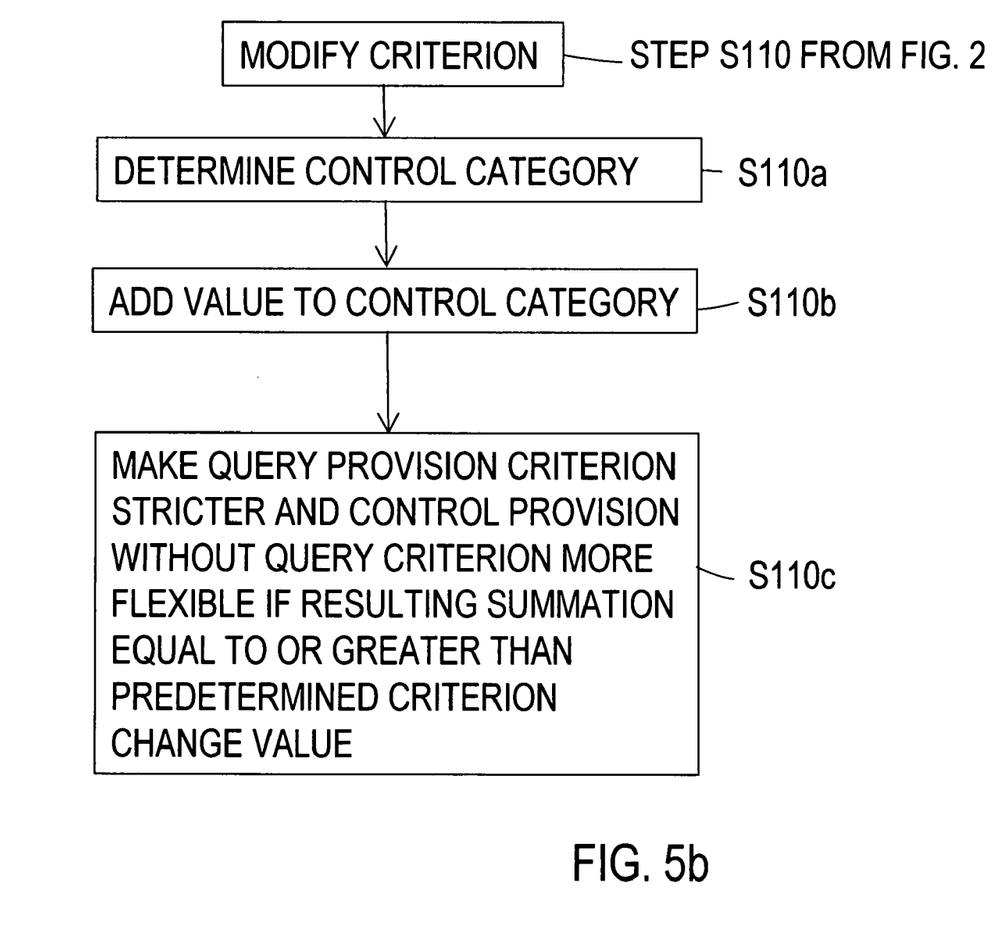
FIG. 5b shows a flowchart of example sub-steps of process step S110 illustrated in FIG. 2.

The process also modifies the query provision criterion and the control provision without query criterion in step S110 when the determination in step S90 is negative (step S90: NO). However, the modification in step S110 is different from the one in step S100. As illustrated in sub-step S110a of FIG. 5b, the process in step S110 also determines, in a first place, that which control category in a predetermined set of control categories includes the control value of the control provision determination information acquired in step S10. As illustrated in sub-step S110b of FIG. 5b, the process adds a value of 1 to a plurality of control categories (an initial value of the summation is 0). As illustrated in sub-step S110c of FIG. 5b, the resulting summation equal to or greater than a predetermined criterion change value on a positive value side indicates that the driver has responded to the query of control provision affirmatively for plural times as long as the control provision determination information is within a same range. Therefore, the process makes the query provision criterion stricter (i.e., more strict or narrower) while making the control provision without query criterion more flexible based on the assumption that the provision of the control is certainly requested by the user when the summation is equal to or greater than the criterion change value.

The process proceeds to step S120 when the NO button 60 is pressed within a predetermined period, or when neither of the YES or NO button is pressed within a predetermined period (step S70: NO).

Figure 5C:
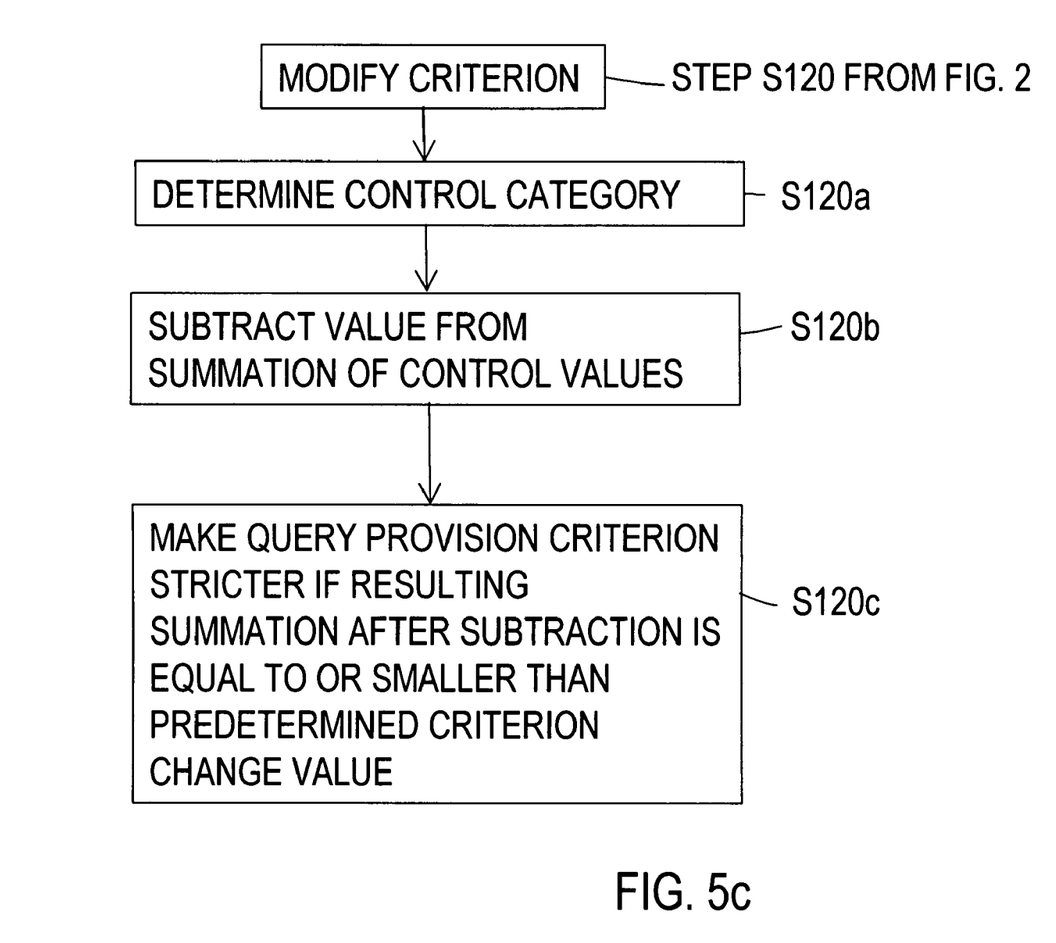
FIG. 5c shows a flowchart of example sub-steps of process step S120 illustrated in FIG. 2.

The process in step S120 also modifies the criterion (as shown for example by the sub-steps S120a-S120c in FIG. 5c). In this case, the process subtracts a different value that is greater than the value used in step S110 from the summation of the control values of the control categories, as shown is step S120b. For example, the process subtracts a value of 3 instead of the value of 1 from the summation. In this manner, the control provision without query criterion is not likely to be more flexible, and the query provision criterion is not likely to be stricter. However, an increased range of the control provision without query criterion has an increased probability to include the control provision determination information of the situation, thereby decreases the probability of the control provision for the automotive systems 100, 200, 300 when the control of the automotive systems 100, 200, 300 is unnecessary.

As illustrated in sub-step S120c of FIG. 5c, the resulting summation after subtraction having the value that is equal to or smaller than a predetermined criterion change value on a negative value side indicates that the driver has responded to the query of control provision negatively for plural times as long as the control provision determination information is within a same range. Therefore, the process makes the query provision criterion stricter based on the assumption that the provision of the control is not at all requested by the user when the summation is equal to or smaller than the criterion change value on the negative value side.

Negative determination in step S20 makes the process proceeds to step S130. That is, when the control provision determination information acquired in step S10 does not fulfill the query provision criterion nor the control provision without query criterion, the process detects and determines whether the automotive systems 100, 200, 300 are operated manually. The process concludes itself when the manual operation of the automotive systems 100, 200, 300 is not detected. The process proceeds to step S140 when the manual operation of the automotive systems 100, 200, 300 is detected.

Figure 5D:
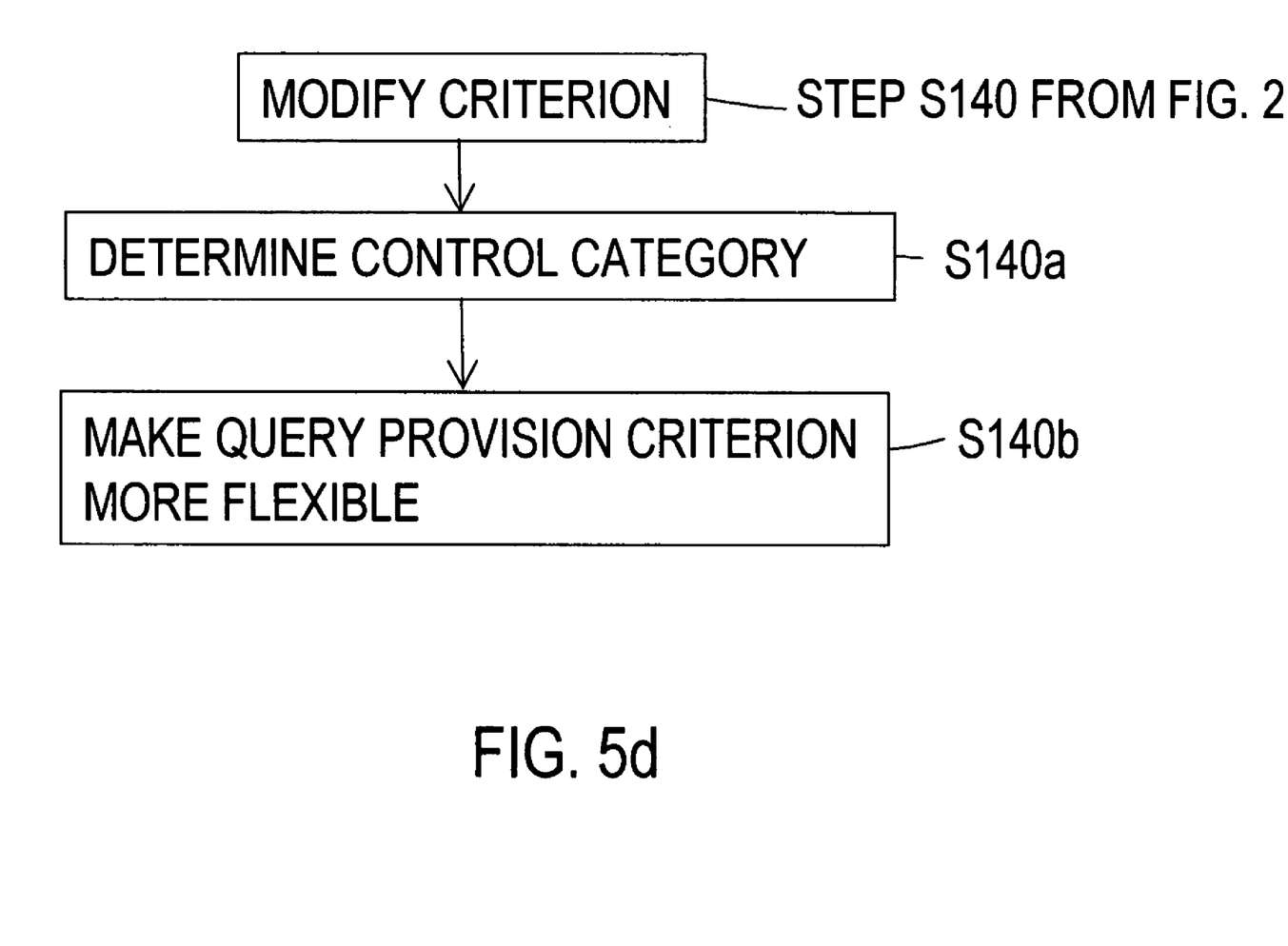
FIG. 5d shows a flowchart of example sub-steps of process step S140 illustrated in FIG. 2.

As illustrated in sub-step S140a of FIG. 5d, the process in step S140 determines, as in steps S100, S110, or S120, which control category in the predetermined set of control categories includes the control value of the control provision determination information acquired in step S10. Then, in sub-step S140b, the process makes the query provision criterion more flexible so that the control category determined above is included in the query provision criterion.

The process shown in FIG. 2 is iteratively executed as mentioned before. Therefore, the response of the driver in step S60 is accumulated for plural times as steps S110 and S120 are repeated. As a result, the query provision criterion is gradually made stricter and the control provision without query criterion is gradually made more flexible. That is, the uncomfortableness of the driver caused by the unnecessary query becomes less likely while the probability of control provision of the automotive system by the automatic control system 10 increases as frequency of the query of control provision decreases in due course.

Further, the control provision without query criterion will not include the control category that is not initially included in the query provision criterion by the modification in steps S110 and S120 even when steps S110 and S120 are repeated. However, the process in step S140 makes the query provision criterion more flexible when the manual operation without provision of the query of control provision is detected. The increase of the query provision criterion provided in step S140 may possibly be included in the control provision without query criterion when the modification in steps S110 and S120 is repeated. Therefore, the control provision without query criterion will be made more flexible through modification even when the query provision criterion at an initial stage of operation is not strictly defined.

Furthermore, the modification in steps S110 and S120 is not likely to make the control provision without query criterion more flexible because the a value to be added to the summation is smaller than the value to be subtracted therefrom. As a result, the provision of the control unwanted by the driver is suppressed. In addition, the provision of the control revoked by the user is reflected to the criterion in step S100, thereby decrease of the probability of control provision that is not desired by the user is even more facilitated.

The effectiveness of the embodiment of the present disclosure is clearly observed in a manner of query provision for the user prior to the provision of the control to the automotive systems 100, 200, 300 based on the agreement of the control provision determination information with the query provision criterion. That is, the query of the control provision for the user prior to the control provision decreases the probability of unnecessary control provision of the automotive systems 100, 200, 300, thereby causing the driver to have a decreased chance of feeling the uncomfortableness. Further, when the control provision without query criterion is satisfied, the control of the automotive systems 100, 200, 300 is provided without the query of the control provision, thereby enabling a maintained probability of the provision of the control of the automotive systems 100, 200, 300 without the query when the provision is desired by the user.

Figure 3:
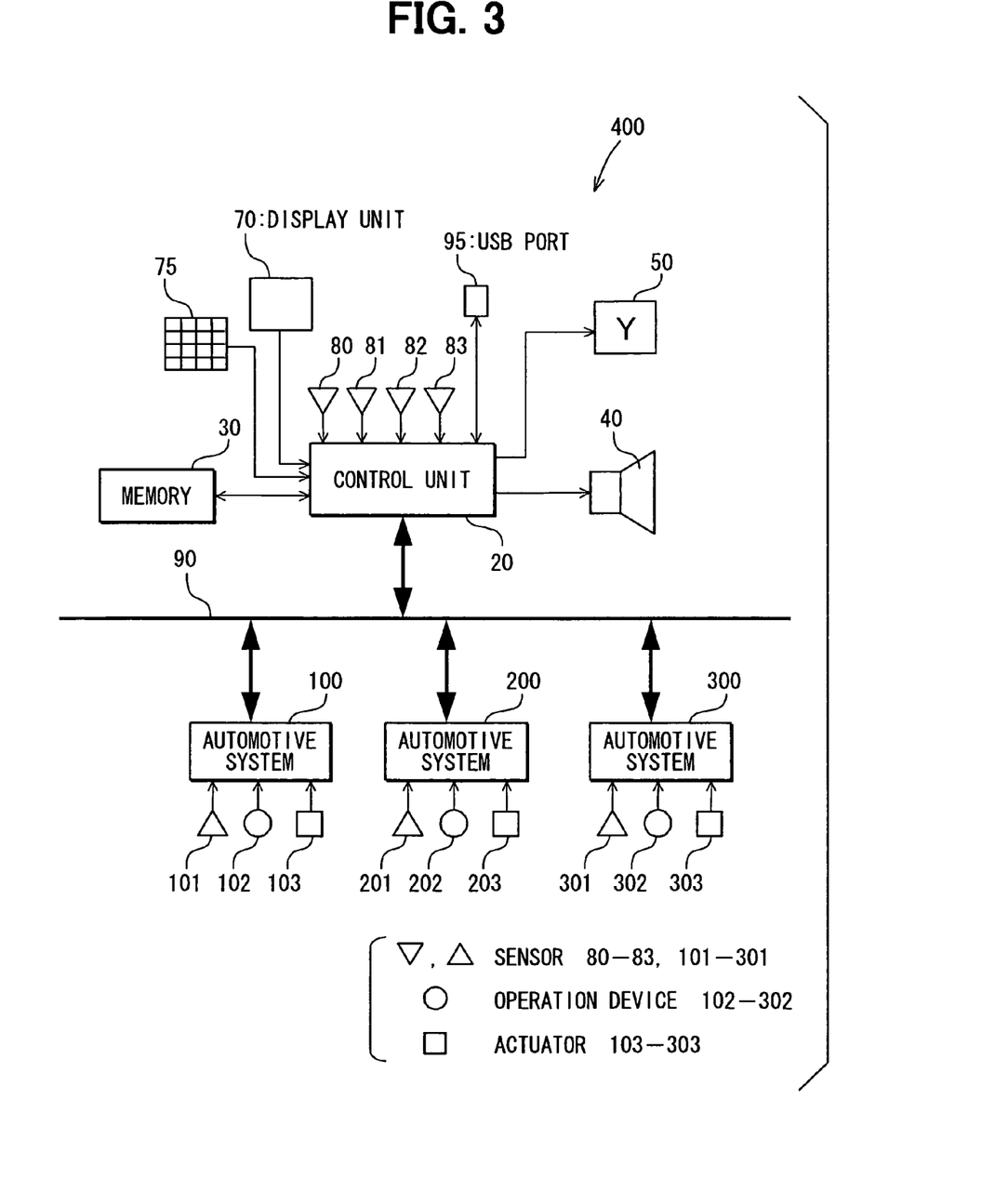
FIG. 3 shows a block diagram of the automatic control system in a second embodiment of the present disclosure.

FIG. 3 shows a block diagram of the automatic control system 400 in a second embodiment of the present disclosure.

Difference between the first embodiment and the second embodiment is that there is no NO button 60 used in the second embodiment. That is, in the second embodiment, the automatic control system 400 has only the YES button 50.

The process of the flowchart shown in FIG. 2 is also executed in the second embodiment. However, the process in step S70 is different from the one in the first embodiment. In the first embodiment, pressing of NO button 60 within a predetermined period, or an absence of pressing of either of the YES or NO button within a predetermined period is taken as a negative response from the driver. In the second embodiment, the negative response in step S70 is determined as an absence of pressing of the YES button 50 within a predetermined period because the automatic control system 400 has only the YES button 50. The second embodiment of the automatic control system 400 has the same structure and same function as the first embodiment except for the above-described difference.

Although the present disclosure has been fully described in connection with the preferred embodiments thereof with reference to the accompanying drawings, it is to be noted that various changes and modifications will become apparent to those skilled in the art.

For example, the modification in step S140 allows the control provision determination information to be included in the query provision criterion. However, the modification in step S140 may be an expansive change of the query provision criterion toward an inclusion of the control provision determination information. The expansive change may be defined as a change of a boundary value of the query provision criterion. The change of the boundary value may take a certain value step such as a value of 1 for each occurrence.

The modification in step S100 may also be made in the same manner as the modification in step S140. That is, the expansive modification of the boundary value of the query provision criterion may be defined as a stepwise change toward inclusion of the control value of the control provision determination information.

The response to the query of control provision may be provided by using a voice from the user instead of pressing the YES button 50 or the NO button 60.

The query message is provided from the speaker 40 in the first embodiment. The query message from the speaker 40 may be accompanied by, or may be replaced with the query message from the display unit 70.

In the first embodiment, when the driver enters the vehicle, the automatic control system 10 asks the driver a question whether he/she desires the query of control provision by providing the message from the speaker 40. However, the question from the automatic control system 10 may be skipped for automatically providing the query of control provision.

In step S70 of the first embodiment, the absence of pressing the YES button 50 or the NO button within a predetermined period is considered as the negative response from the driver. However, the absence of pressing may be considered as the affirmative response from the driver.

Such changes and modifications are to be understood as being within the scope of the present disclosure as defined by the appended claims.

What is claimed is:

1. An automatic control system for controlling a device disposed on a vehicle based on acquired information, the control system comprising:

a machine readable medium for storing a first condition having a first criterion and a second condition having a second criterion; and a controller for performing automatic control of the device, the controller including:

means for providing, when the acquired information meets the first criterion of the first condition, the automatic control of the device after providing a user query to the user regarding whether or not to provide the automatic control and receiving an affirmative user response to the user query;

means for providing, when the acquired information meets the second criterion of the second condition, the automatic control of the device without providing a user query;

wherein the device is operable by the user in the vehicle, and the second criterion is modified so as to be stricter after the automatic control of the device is provided by the controller without providing a user query and the user changes the automatic control of the device.

2. An automatic control system for controlling a device disposed on a vehicle based on acquired information, the control system comprising:

a machine readable medium for storing a first condition having a first criterion and a second condition having a second criterion; and a controller for performing automatic control of the device, the controller including:

means for providing, when the acquired information meets the first criterion of the first condition, the automatic control of the device after providing a user query to the user regarding whether or not to provide the automatic control and receiving an affirmative user response to the user query;

means for providing, when the acquired information meets the second criterion of the second condition, the automatic control of the device without providing a user query; and a modification means for modifying the first criterion, wherein the modification means modifies the first criterion and the second criterion based on a response to the user query after the user query has been provided, the first criterion is made stricter by the modification means, and the second criterion is made more flexible.

3. The automatic control system as in claim 2, wherein, when the user query is affirmed, the first criterion is made stricter and the second criterion is made more flexible on condition that a summation of control values of control categories respectively having the acquired information in a predetermined set of control categories is greater than a predetermined criterion change value after increasing each of the control values by a predetermined additive value to each of the control values, and when the user query has a negative response, a predetermined value that is greater than the predetermined additive value is subtracted from the summation of the control values.

4. The automatic control system as in claim 2, wherein the device is operable by the user in the vehicle, and when the user changes the control of the device after the control of the device is provided by the controller based on the control changed by the user, the first criterion and the second criterion are modified.

5. The automatic control system as in claim 2, wherein the device is operable by the user in the vehicle, and the first criterion is modified when the user operated the device on a condition that neither of the agreement of the acquired information with the first criterion and the agreement of the acquired information with the second criterion is achieved.

6. The automatic control system as in claim 2, wherein the user query is formed as a YES/NO type question for the user, and the user is encouraged to respond to the YES/NO type question by using one of a YES button and a NO button respectively disposed on the automatic control system.

7. The automatic control system as in claim 6, wherein absence of response to the YES/NO type question by using one of the YES button and the NO button for a predetermined period after the user query leads to provision of the control of the device based on a predetermined response from the user by an operation of one of the YES button and the NO button.

8. The automatic control system as in claim 6, wherein the user query is provided for controlling a plurality of the devices, and a response for the user query for controlling the plural devices is inputted by one of a single button and a combination of an affirmative response button and a negative response button.

9. The automatic control system as in claim 6, wherein the user query is provided for controlling a plurality of the devices, and a response for the user query for controlling all of the plural devices is inputted by one of a single button and a combination of an affirmative response button and a negative response button.

10. An automotive vehicle having the automatic control system as in claim 9, wherein the automatic control system is disposed on board.

11. The automatic control system as in claim 2, wherein the user query is formed as a YES/NO type question for the user, a response to the question by using a single button disposed on the automatic control system is inputted as one of an affirmative response and a negative response to the question, the user is encouraged to respond to the YES/NO type question by using the single button, and absence of response to the YES/NO type question by using the single button for a predetermined period after the user query leads to provision of the control of the device based on a reversed response from the user by an operation of the single button.

12. The automatic control system as in claim 11, wherein the single button is disposed as an affirmative response button, and absence of response to the YES/NO type question by using the affirmative response button for the predetermined period after the user query leads to provision of the control of the device based on a negative response from the user.

13. The automatic control system as in claim 2 further comprising:

a driver recognition means for recognizing a driver of the vehicle, wherein the first criterion and the second criterion are prepared for an individual driver recognized by the driver recognition means.

14. The automatic control system as in claim 2 further comprising:
an output means for outputting a query output for determining whether the user query is provided based on boarding of the driver on the vehicle,
wherein the user query is provided based on an affirmative response by a predetermined input to the query output from the output means.

15. The automatic control system as in claim 2,
wherein a button disposed on the automatic control system is used to give an affirmative response to a query output for determining whether the user query is provided based on boarding of the driver on the vehicle.

16. The automatic control system as in claim 2,
wherein a button disposed on the automatic control system is used to give a negative response to a query output for determining whether the user query is provided based on boarding of the driver on the vehicle.

17. The automatic control system as in claim 2,
wherein the agreement of a query prohibition criterion for preventing distraction caused by querying for the driver is determined when the first criterion is satisfied, and
the user query is prohibited when the query prohibition criterion is satisfied.

18. The automatic control system as in claim 17,
wherein the query prohibition criterion is defined as a steering angle being equal to or greater than a predetermined angle that requires a series of successive operations.

19. The automatic control system as in claim 17,
wherein the query prohibition criterion is defined as a throttle opening angle being equal to or greater than a predetermined angle.

20. The automatic control system as in claim 17,
wherein the query prohibition criterion is defined as a brake operation.

21. The automatic control system as in claim 2,
wherein the first criterion and the second criterion are susceptible of outputting toward an external device.

22. The automatic control system as in claim 2,
wherein the first criterion and the second criterion are susceptible of inputting from an external device.

23. The automatic control system as in claim 2,
wherein the control provision for a predetermined device that is operable by the user and outputs one of no response and a subtle response to an operation by the user is accompanied by an output of a control provision notification for the device when the control is provided without the user query.

24. The automatic control system as in claim 2, wherein the device disposed on the vehicle includes a plurality of equipments having respectively different functions.

25. The automatic control system as in claim 24, wherein the machine readable medium stores one of said first condition and one of said second condition for each of the plurality of equipments, respectively.

26. The automatic control system as in claim 24, wherein the controller selects the first condition and the second condition to be utilized for a determination of whether to provide the automatic control to a target piece of equipment when information on the target equipment is acquired.

27. The automatic control system as in claim 24, wherein content of the user query, provided when the first criterion of the first condition is met, is different for different ones of the plurality of equipments.

28. A method of automatically controlling a device disposed on a vehicle, the method comprising:
storing a first condition having a first criterion and a second condition having a second criterion in a machine readable storage medium;
acquiring information relating to the vehicle; and
providing, when the acquired information meets the first criterion of the first condition, automatic control of the device after providing a user query to the user regarding whether or not to provide the automatic control and receiving an affirmative user response to the user query;
providing, when the acquired information meets the second criterion of the second condition, automatic control of the device without providing a user query; and
modifying the first criterion and the second criterion after the user query has been provided based on the user response to the user query,
wherein the first criterion is made stricter and the second criterion is made more flexible.

29. The method as in claim 28, wherein the device disposed on the vehicle includes a plurality of equipments having respectively different functions.

30. The method as in claim 29, wherein the machine readable storage medium stores one of said first condition and one of said second condition for each of the plurality of equipments, respectively.

31. The method as in claim 29, further comprising selecting the first condition and the second condition to be utilized for a determination of whether to provide the automatic control to a target piece of equipment when information on the target equipment is acquired.

32. The method as in claim 29, wherein content of the user query, provided when the first criterion of the first condition is met, is different for different ones of the plurality of equipments.

33. The method as in claim 28, wherein the device is operable by the user in the vehicle, and when the user changes the control of the device after the control of the device is provided by the controller based on the control changed by the user, the first criterion and the second criterion are modified.

34. A method of automatically controlling a device disposed on a vehicle, the method comprising:
storing a first condition having a first criterion and a second condition having a second criterion in a machine readable storage medium;
acquiring information relating to the vehicle; and
providing, when the acquired information meets the first criterion of the first condition, automatic control of the device after providing a user query to the user regarding whether or not to provide the automatic control and receiving an affirmative user response to the user query; and
providing, when the acquired information meets the second criterion of the second condition, automatic control of the device without providing a user query;
wherein the device is operable by the user in the vehicle, and the second criterion is modified so as to be stricter after the automatic control of the device is provided by the controller without providing a user query and the user changes the automatic control of the device.

* * * * *